UNITED STATES PATENT OFFICE.

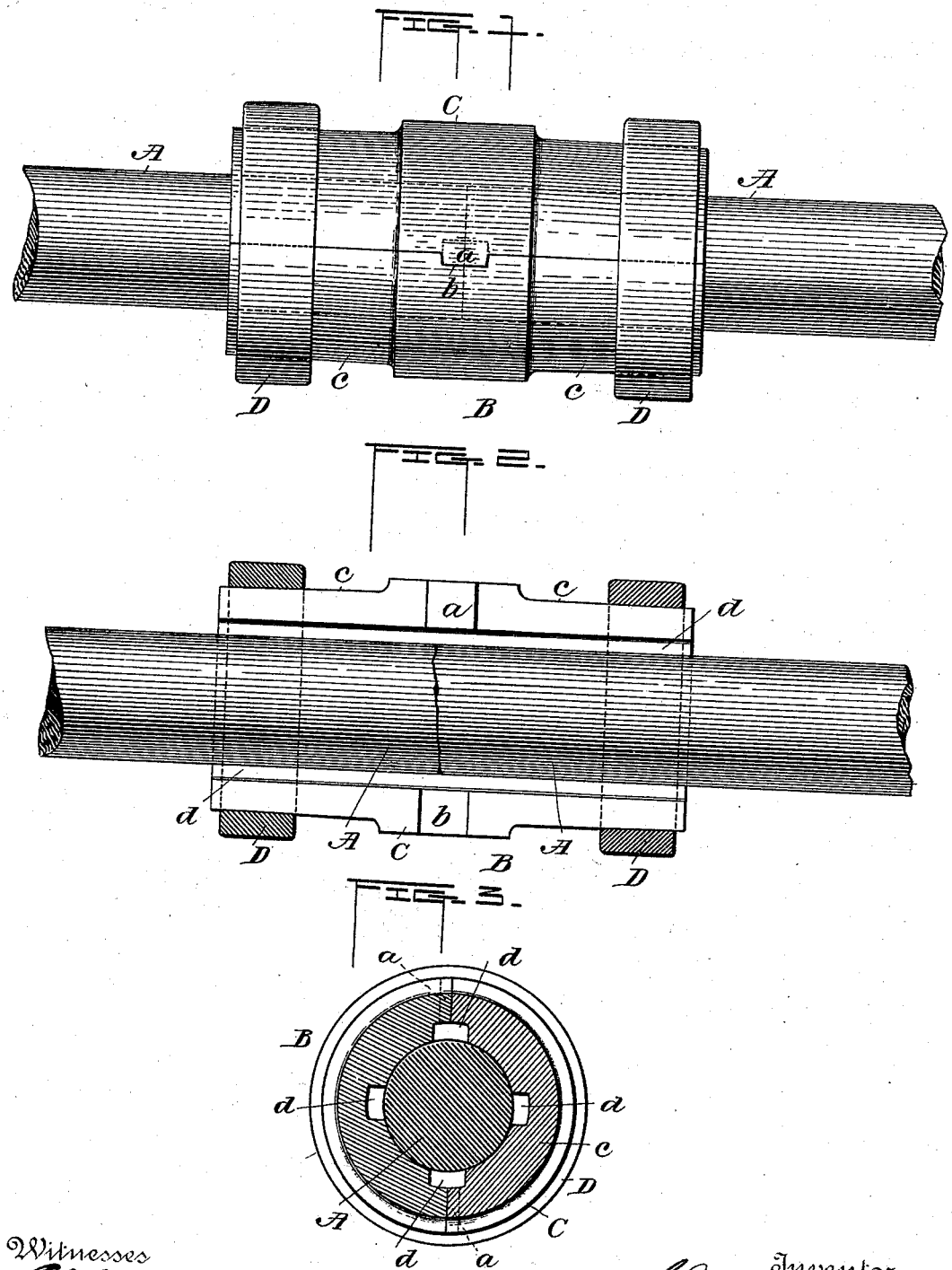

SHERMAN CROLLEY, OF BROWNSVILLE, PENNSYLVANIA, ASSIGNOR TO THE SNOWDON MANUFACTURING COMPANY, OF SAME PLACE.

SHAFT-COUPLING.

SPECIFICATION forming part of Letters Patent No. 513,609, dated January 30, 1894.

Application filed February 16, 1893. Serial No. 462,573. (No model.)

*To all whom it may concern:*

Be it known that I, SHERMAN CROLLEY, a citizen of the United States, residing at Brownsville, in the county of Fayette and State of Pennsylvania, have invented certain new and useful Improvements in Shaft-Couplings, of which the following is a description, reference being had to the accompanying drawings, and to the letters of reference marked thereon.

My invention relates to an improvement in shaft couplings and has for an object to provide a simple, safe and comparatively inexpensive device for the use above referred to.

The invention comprises a split sleeve tapering slightly on either end and having interior grooves which impart elasticity to the metal, enabling it to be compressed under pressure.

Secondly. It consists of a split sleeve tapering slightly on either end and having internal longitudinal grooves, and rings or collars adapted to be forced over the ends of the sleeve to force the parts of the sleeve more firmly upon the contained shaft owing to the elasticity of the metal of which the sleeve is composed.

In the accompanying drawings Figure 1 is a view of my invention when in position for use. Fig. 2 is a longitudinal section; and Fig. 3, a vertical section of the sleeve.

In the drawings A, A, represent the ends of shafts or of a broken shaft, to be coupled together.

B represents the coupling sleeve, formed, as herein shown, in two parts, each part having a lug $a$ and recess $b$ fitting a corresponding recess and lug in the other portion of the sleeve. Each half of the sleeve has a thickened central portion C, and reduced end portions $c$, said end portions $c$ having a slight taper as shown. The sleeve is provided with interior longitudinal grooves $d$, which may be either cut or cast therein, and may be straight, zig-zag or spiral. Inasmuch as the sleeve is thicker in the central portion than toward the ends, the formation of the grooves will make the ends of the sleeve weaker and, owing to the elasticity of the metal, render them capable of compression under strain.

In order to hold the parts of the sleeve together and compress them on the shaft, rings D, D, are adapted to be slipped over the ends of the sleeve and forced thereon. The ends of the shafts being placed together, the two halves of the sleeve are placed around the shaft and the rings having been previously slipped one on either side of the point of joining, are now forced on the ends of the sleeve by pressure, or else driven, the grooves in the sleeve and the elasticity of the metal allowing the rings to decrease the circumference of the circle in contact with the shaft, thus increasing the pressure and making a firmer joint than can be made in any other way.

It will be seen that a number of advantages are possessed by my device, among which are, that the coupling is smooth on its external surface, thus reducing the danger of accident by catching the garments of workmen on bolts or screwheads which are used ordinarily on couplings; that the grooves increase the elasticity of the metal and decrease the circumference of the circle in contact with the shaft, whereby a greater pressure can be brought to bear on the shaft; and, finally, by my arrangement shafts of varying sizes can be coupled, for if the shaft be smaller than the bore, the elasticity of the metal enables me to force it on the shaft.

Having thus described my invention, what I claim as new, and desire to secure by Letters Patent, is—

A coupling for shafts and the like comprising a split sleeve with thickened central portion and tapering end portions, there being longitudinal slots in said sleeve to render the same elastic, a lug upon one portion of the split sleeve, and a corresponding recess in the other portion, and rings adapted to be forced upon the tapering ends to compress the sleeve around the shafts; substantially as described.

In testimony whereof I affix my signature in presence of two witnesses.

SHERMAN CROLLEY.

Witnesses:
HENRY W. GOULD,
S. H. MUELTART.